United States Patent
Hotta et al.

(10) Patent No.: US 9,563,058 B2
(45) Date of Patent: Feb. 7, 2017

(54) DISPLAY DEVICE, DISPLAY METHOD, AND READABLE MEDIUM

(71) Applicant: KABUSHIKI KAISHA TOSHIBA, Minato-ku, Tokyo (JP)

(72) Inventors: Aira Hotta, Kanagawa-ken (JP); Haruhiko Okumura, Kanagawa-ken (JP); Akihisa Moriya, Kanagawa-ken (JP); Tsuyoshi Tasaki, Kanagawa-ken (JP); Takashi Sasaki, Kanagawa-ken (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 96 days.

(21) Appl. No.: 13/975,537

(22) Filed: Aug. 26, 2013

(65) Prior Publication Data
US 2014/0055324 A1   Feb. 27, 2014

(30) Foreign Application Priority Data
Aug. 27, 2012 (JP) ................. 2012-186942

(51) Int. Cl.
  *G02B 27/01* (2006.01)
  *G06F 3/01* (2006.01)

(52) U.S. Cl.
  CPC ....... *G02B 27/0176* (2013.01); *G02B 27/0172* (2013.01); *G06F 3/012* (2013.01); *G02B 2027/014* (2013.01); *G02B 2027/0138* (2013.01)

(58) Field of Classification Search
CPC .................................................. G02B 27/017
(Continued)

(56) References Cited

U.S. PATENT DOCUMENTS

| | | | |
|---|---|---|---|
| 8,681,256 B2 * | 3/2014 | Sako et al. | ............... 348/333.02 |
| 2013/0044042 A1 * | 2/2013 | Olsson | ............... G02B 27/0176 345/8 |

(Continued)

FOREIGN PATENT DOCUMENTS

| | | |
|---|---|---|
| JP | 08-160340 | 6/1996 |
| JP | 2005-172851 | 6/2005 |

(Continued)

OTHER PUBLICATIONS

Office Action of Notification of Reason(s) for Refusal for Japanese Patent Application No. 2012-186942 Dated Aug. 19, 2014, 8 pgs.

*Primary Examiner* — Amare Mengistu
*Assistant Examiner* — Joseph G Rodriguez
(74) *Attorney, Agent, or Firm* — Amin, Turocy & Watson LLP

(57) ABSTRACT

According to one embodiment, a display device includes an imaging unit, an information acquisition unit, a display unit, and a first transmittance control unit. The imaging unit images a first image and generates imaging data. The information acquisition unit acquires first information derived from the imaging data and relating to a second image. The display unit includes an image light emission unit and a semi-transmissive reflection plate. The image light emission unit emits image light. The semi-transmissive reflection plate causes the image light to be incident on one eye and causes background light of the first image to be incident on the one eye. The semi-transmissive reflection plate is disposed between the first transmittance control unit having first and second regions and the one eye. The first transmittance control unit causes a transmittance of the first region to be lower than a transmittance of the second region.

15 Claims, 6 Drawing Sheets

(58) Field of Classification Search
USPC .................................................... 345/8, 633
See application file for complete search history.

(56) References Cited

U.S. PATENT DOCUMENTS

2013/0293577 A1* 11/2013 Perez ................... G02B 27/017
                                                              345/633
2014/0063055 A1*  3/2014 Osterhout et al. ............ 345/633

FOREIGN PATENT DOCUMENTS

JP        2007-334185        12/2007
JP        2008-176096         7/2008

* cited by examiner

DISPLAY DEVICE, DISPLAY METHOD, AND READABLE MEDIUM

CROSS-REFERENCE TO RELATED APPLICATIONS

This application is based upon and claims the benefit of priority from Japanese Patent Application No. 2012-186942, filed on Aug. 27, 2012; the entire contents of which are incorporated herein by reference.

FIELD

Embodiments described herein relate generally to display device.

BACKGROUND

Head mounted displays (HMDs) that are mounted on the head of a user have been developed to provide a display to the eye of the user. Such a HMD may use a video see-through approach or an optical see-through approach. In the video see-through approach, the external light is blocked; and only an image is shown. In the optical see-through approach, an image is shown by being superimposed onto the external light image. Viewing is difficult in the optical see-through approach because the image is superimposed onto the external light image.

DETAILED DESCRIPTION

Figure 1:
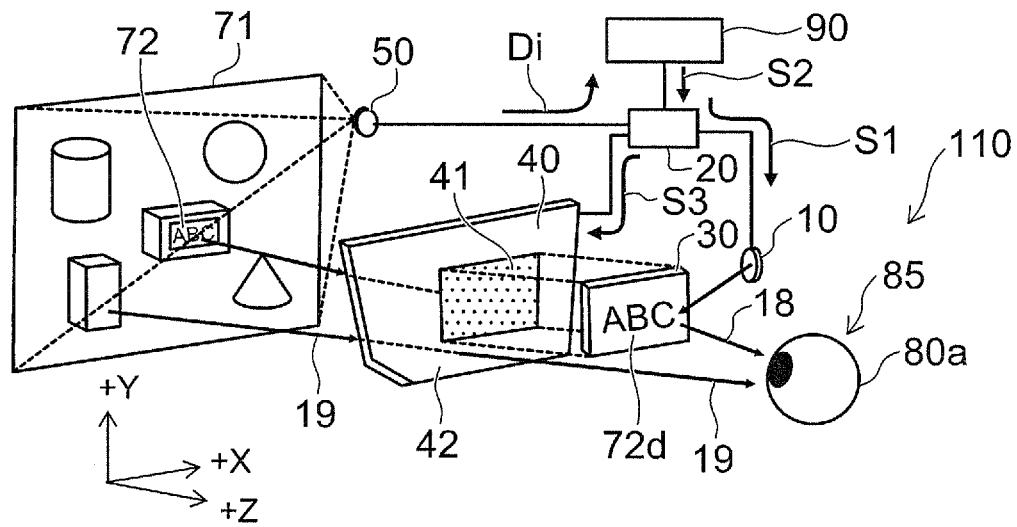
FIG. 1 is a schematic view showing an operation of a display device according to a first embodiment.

According to one embodiment, a display device includes an imaging unit, an information acquisition unit, a display unit, and a first transmittance control unit. The imaging unit is configured to image a first image viewable by a human viewer and generate imaging data relating to the first image. The information acquisition unit is configured to acquire first information derived based on the imaging data. The first information relates to a second image inside the first image. The second image is inferred to be viewed by the human viewer. The display unit includes an image light emission unit and a semi-transmissive reflection plate. The image light emission unit is configured to emit image light including a display object based on the first information. The semi-transmissive reflection plate is configured to cause the image light to be incident on one eye of the human viewer by reflecting the image light and is configured to cause background light of at least a portion of the first image to be incident on the one eye by transmitting the background light. The semi-transmissive reflection plate is disposed between the first transmittance control unit and the one eye. The first transmittance control unit has a first region overlapping the second image as viewed by the one eye and a second region not overlapping the second image as viewed by the one eye. The first transmittance control unit is configured to implement a first operation of causing a transmittance of the first region to be lower than a transmittance of the second region while causing the background light to be incident on the semi-transmissive reflection plate by causing the background light to pass through the second region.

According to another embodiment, a display device includes an imaging unit, an information acquisition unit, a display unit, and a second transmittance control unit. The imaging unit is configured to image a first image viewable by a human viewer and generate imaging data relating to the first image. The information acquisition unit is configured to acquire first information and second information derived based on the imaging data. The first information relates to a second image inside the first image. The second image is inferred to be viewed by the human viewer. The second information includes a result of determining whether or not the human viewer is paying attention to the second image. The display unit includes an image light emission unit and a semi-transmissive reflection plate. The image light emission unit is configured to emit image light including a display object based on the first information. The semi-transmissive reflection plate is configured to cause the image light to be incident on one eye of the human viewer by reflecting the image light and is configured to cause background light of at least a portion of the first image to be incident on the one eye by transmitting the background light. The second transmittance control unit is arranged with the display unit. The second transmittance control unit has variable transmittance to light traveling toward other eye of the human viewer. The second transmittance control unit is configured to implement an operation of causing, based on the second information, a transmittance of at least a portion of the second transmittance control unit when the result is a result of the human viewer being determined to be paying attention to be lower than the transmittance of the at least a portion of the second transmittance control unit when the result is a result of the human viewer being determined not to be paying attention.

According to another embodiment, a display method is disclosed. The method can include imaging a first image viewable by a human viewer and generating imaging data relating to the first image. The method can include producing, based on the imaging data, image light including a display object based on a second image inside the first image. The second image is inferred to be viewed by the human viewer. The method can include causing a background light of at least a portion of the first image to be incident on one eye of the human viewer by causing the background light to pass through a region of a semi-transmissive reflection plate not overlapping the second image as viewed by the one eye while causing the image light to be incident on the one eye by being reflected by a region of the semi-transmissive reflection plate overlapping the second image as viewed by the one eye. The semi-transmissive reflection plate is provided in front of the one eye of the human viewer. In addition, the method can include causing an intensity of the background light incident on the one eye of the human viewer via the region of the semi-transmissive reflection plate overlapping the second image as viewed by the one eye to be lower than an intensity of the background light incident on the one eye via the region of the semi-transmissive reflection plate not overlapping the second image as viewed by the one eye.

According to another embodiment, a display method is disclosed. The method can include imaging a first image viewable by a human viewer and generating imaging data relating to the first image. The method can include producing, based on the imaging data, image light including a display object based on a second image inside the first image. The second image is inferred to be viewed by the human viewer. The method can include causing a background light of at least a portion of the first image to be incident on one eye of the human viewer by causing the background light to pass through a semi-transmissive reflection plate while causing the image light to be incident on the one eye by being reflected by the semi-transmissive reflection plate. The method can include determining whether or not the human viewer is paying attention to the second image. In addition, the method can include causing an intensity of light of at least a portion of the first image incident on other eye of the human viewer when the human viewer is determined to be paying attention to the second image to be lower than the intensity of the light of the at least a portion of the first image incident on the other eye when the human viewer is determined not to be paying attention to the second image.

According to another embodiment, a readable medium is configured to cause a computer to generate imaging data relating to a first image viewable by a human viewer. The readable medium is configured to cause the computer to derive, based on the imaging data, first information relating to a second image inside the first image. The second image is inferred to be viewed by the human viewer. The readable medium is configured to cause the computer to emit image light including a display object based on the first information, cause the image light to be incident on one eye of the human viewer by causing a semi-transmissive reflection plate provided in front of the one eye to reflect the image light, and cause a background light of at least a portion of the first image to be incident on the one eye by causing the background light to pass through the semi-transmissive reflection plate. The readable medium is configured to cause the computer to cause the first transmittance control unit to implement a first operation. The semi-transmissive reflection plate is disposed between the first transmittance control unit and the one eye. The first transmittance control unit has a first region overlapping the second image as viewed by the one eye and a second region not overlapping the second image as viewed by the one eye. The first operation includes causing a transmittance of the first region to be lower than a transmittance of the second region while causing the background light to be incident on the semi-transmissive reflection plate by causing the background light to pass through the second region.

According to another embodiment, a readable medium is configured to cause a computer to image a first image viewable by a human viewer and generate imaging data relating to the first image. The readable medium is configured to cause the computer to determine whether or not the human viewer is paying attention to the second image by deriving, based on the imaging data, first information relating to a second image inside the first image. The second image is inferred to be viewed by the human viewer. The readable medium is configured to cause the computer to emit image light including a display object based on the first information, causes the image light to be incident on one eye of the human viewer by causing a semi-transmissive reflection plate provided in front of the one eye to reflect the image light, and causes a background light of at least a portion of the first image to be incident on the one eye by causing the background light to pass through the semi-transmissive reflection plate. The readable medium is configured to cause the computer to implement an operation of causing a transmittance of at least a portion of a second transmittance control unit when the human viewer is determined to be paying attention to be lower than a transmittance of the at least a portion of the second transmittance control unit when the human viewer is determined not to be paying attention. The second transmittance control unit is provided in front of other eye of the human viewer and has variable transmittance to light traveling toward the other eye.

Various embodiments will be described hereinafter with reference to the accompanying drawings.

The drawings are schematic or conceptual; and the relationships between the thicknesses and widths of portions, the proportions of sizes between portions, etc., are not necessarily the same as the actual values thereof. Further, the dimensions and/or the proportions may be illustrated differently between the drawings, even for identical portions.

In the drawings and the specification of the application, components similar to those described in regard to a drawing thereinabove are marked with like reference numerals, and a detailed description is omitted as appropriate.

First Embodiment

FIG. 1 is a schematic view illustrating an operation of a display device according to a first embodiment.

Figure 2:
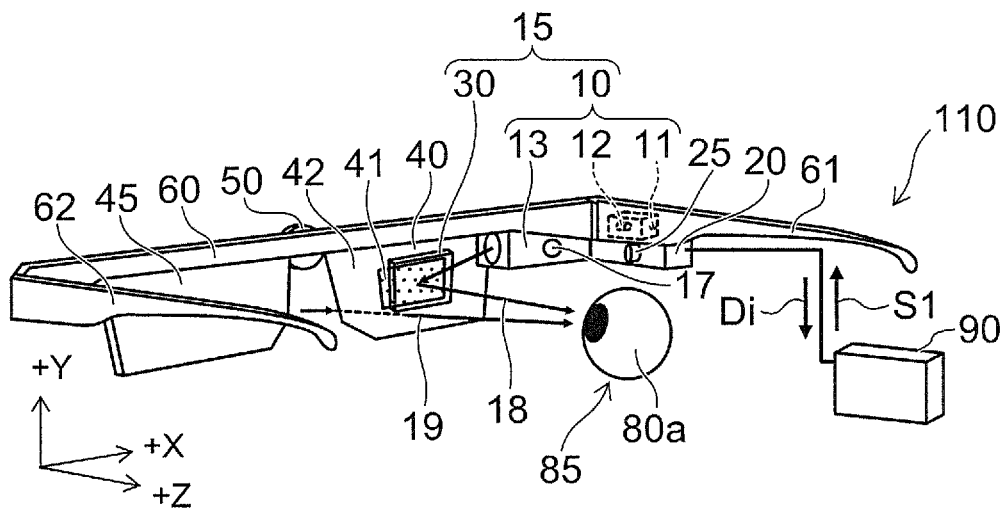
FIG. 2 is a schematic perspective view showing the display device according to the first embodiment.

FIG. 2 is a schematic perspective view illustrating the configuration of the display device according to the first embodiment.

Figure 3:
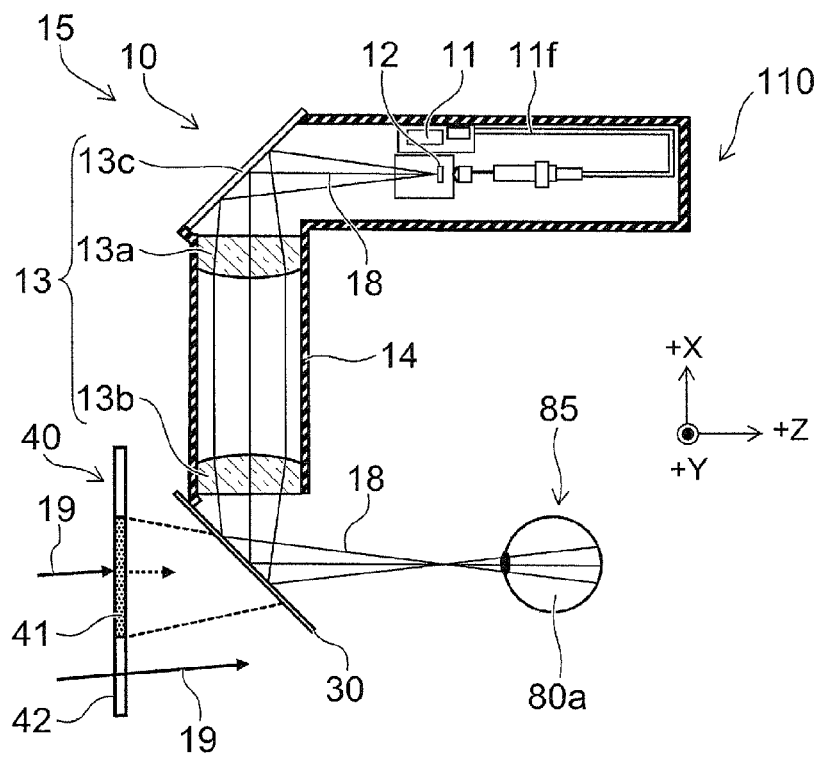
FIG. 3 is a schematic plan view showing the display device according to the first embodiment.

FIG. 3 is a schematic plan view illustrating the configuration of the display device according to the first embodiment.

As shown in FIG. 2, the display device 110 according to the embodiment includes an imaging unit 50, an information acquisition unit 20, a display unit 15, and a first transmittance control unit 40.

The display device 110 is used by being worn by a human viewer 85. The display device 110 is, for example, a HMD. In particular, the display device 110 is a monocular see-through HMD.

In the example, a holder 60 is further provided. The holder 60 holds the imaging unit 50, the information acquisition unit 20, the display unit 15, and the first transmittance control unit 40. For example, the holder 60 includes a right-side holding member 61 designed to contact a right-side portion (e.g., proximal to the ear on the right side) of the head of the human viewer 85, and a left-side holding member 62 designed to contact the left-side portion (e.g., proximal to the ear on the left side) of the head of the human viewer 85. Thereby, the holder 60 regulates, for example, the spatial disposition between the display unit 15 and an eye (one eye 80a) of the human viewer 85.

The display device 110 is connected to, for example, an operation control unit 90. Any wired or wireless method is used as the connection between the display device 110 and the operation control unit 90. In the wireless method, for example, a signal of at least one selected from a radio wave and light is used. The display device 110 may further include the operation control unit 90. Hereinbelow, the case is described where the operation control unit 90 is separate from the display device 110. The operation control unit 90 may include any computer. The operation control unit 90 may include, for example, a voice communication function and a data communication function. The operation control unit 90 is connectable to, for example, the internet.

The imaging unit 50 images a first image that is viewable by the human viewer 85. The imaging unit 50 generates imaging data Di relating to the first image.

The information acquisition unit 20 acquires first information S1. The first information S1 is generated by, for example, the operation control unit 90. The first information S1 is derived based on the imaging data Di. The first information S1 relates to a second image. The second image is an image inside the first image that is inferred to be viewed by the human viewer 85. Examples of the first image and the second image are described below.

The information acquisition unit 20 can perform the transfer of information (e.g., data) between the display device 110 and the operation control unit 90. For example, the imaging data Di relating to the first image is supplied to the operation control unit 90 via the information acquisition unit 20. The operation control unit 90 derives the first information S1 relating to the second image based on the imaging data Di. The first information S1 that is derived is supplied to the information acquisition unit 20.

The display unit 15 includes an image light emission unit 10 and a semi-transmissive reflection plate 30.

The image light emission unit 10 is provided, for example, at a side portion of the holder 60. The image light emission unit 10 emits image light 18. The image light 18 includes a display object based on the first information S1. The display object is described below.

For example, the image light emission unit 10 includes a light source 11, a scanning unit 12, and an optical element unit 13. The light source 11 may include, for example, a laser. The scanning unit 12 may include, for example, an optical switch such as a MEMS (Micro Electro Mechanical Systems) element, etc. The optical element unit 13 includes mirrors, lenses, etc. The light source 11 emits light including image information. The light emitted from the light source 11 is scanned by the scanning unit 12. The light that is scanned is emitted as the image light 18 via the optical element unit 13.

The semi-transmissive reflection plate 30 is disposed in front of the one eye 80a of the human viewer 85. The semi-transmissive reflection plate 30 causes the image light 18 to be incident on the one eye 80a of the human viewer 85 by reflecting the image light 18. The semi-transmissive reflection plate 30 causes background light 19 to be incident on the one eye 80a by transmitting the background light 19. The background light 19 is light of at least a portion of the first image that is viewable by the human viewer 85.

The first transmittance control unit 40 is disposed in front of the one eye 80a of the human viewer 85. The first transmittance control unit 40 is disposed further depthward than is the semi-transmissive reflection plate 30 as viewed by the human viewer 85. In other words, the semi-transmissive reflection plate 30 is disposed between the first transmittance control unit 40 and the one eye 80a. At least a portion of the first transmittance control unit 40 may be, for example, in contact with at least a portion of the semi-transmissive reflection plate 30.

The transmittance of the first transmittance control unit 40 is variable. Multiple regions (a first region 41, a second region 42, etc.) are provided in the first transmittance control unit 40. For example, the transmittances of the multiple regions can be modified independently. For example, the first transmittance control unit 40 may include an element having variable transmittance to the light such as a liquid crystal element (e.g., a liquid crystal element that switches between scattering and non-scattering), an electrochromic element, etc. The first transmittance control unit 40 may include, for example, multiple pixel electrodes. Each of the transmittances of the multiple regions corresponding to multiple image electrodes can be modified by electrical signals supplied to the multiple image electrodes, etc. For example, the potential of the pixel electrode is controlled by connecting a switching element such as a thin film transistor, etc., to the pixel electrode. It is favorable for the resolution of the first transmittance control unit 40 to be about the same as the resolution of the image displayed by the image light 18. However, the resolution of the first transmittance control unit 40 is arbitrary.

The positions of the multiple regions (the first region 41, the second region 42, etc.) of the first transmittance control unit 40 are, for example, variable. For example, in one state, the first region 41 is disposed in the central portion of the first transmittance control unit 40; and in another state, the first region 41 may be moved to an end portion of the first transmittance control unit 40.

An example of the operation of the first transmittance control unit 40 is described below.

In the example, a second transmittance control unit 45 is further provided in the display device 110. The second transmittance control unit 45 is disposed in front of the other eye (not-shown in this drawing) of the human viewer 85. The transmittance of the second transmittance control unit 45 is variable. The second transmittance control unit 45 may be provided if necessary and may be omitted.

In the example, a human viewer imaging unit 17 is further provided in the display device 110. The human viewer imaging unit 17 images, for example, the one eye 80a of the human viewer 85. The line of sight of the one eye 80a may be sensed based on the image of the one eye 80a that is imaged by the human viewer imaging unit 17. The human viewer imaging unit 17 may be provided if necessary and may be omitted.

In the example, a motion sensor 25 is further provided in the display device 110. The motion sensor senses, for example, the temporal change of the spatial position of the imaging unit 50. The motion sensor 25 may sense the orientation of the display device 110 (the human viewer 85). The motion sensor 25 may include, for example, an acceleration sensor, etc., that uses a MEMS element. For example, the motion of the human viewer 85 wearing the display device 110 may be sensed by the motion sensor. The motion of the human viewer 85 includes, for example, the state in which the human viewer 85 is walking. The motion sensor 25 may be provided if necessary and may be omitted.

The travel direction of the image light 18 after being reflected by the semi-transmissive reflection plate 30 is taken as a +Z-axis direction. Because the image light 18 is scanned, the travel direction of the light of the image light 18 positioned at the center of the image is taken to be the +Z-axis direction. The +Z-axis direction is the direction from the back toward the front as viewed by the human viewer 85. One direction perpendicular to the +Z-axis direction is taken as a +X-axis direction. A direction perpendicular to the +Z-axis direction and the +X-axis direction is taken as a +Y-axis direction. The +X-axis direction is, for example, the direction from the left toward the right as viewed by the human viewer 85. The +Y-axis direction is, for example, the upward direction from below as viewed by the human viewer 85.

As shown in FIG. 3, a housing 14 is provided in the image light emission unit 10. The housing 14 holds the light source 11, the scanning unit 12, and the optical element unit 13. The housing 14 may further hold the semi-transmissive reflection plate 30. One end of an optical fiber 11$f$ is connected to the light source 11 of the image light emission unit 10. The other end of the optical fiber 11$f$ opposes the scanning unit 12.

In the example, the optical element unit 13 includes, for example, a mirror 13$c$, a first lens 13$a$, and a second lens 13$b$. The first lens 13$a$ and the second lens 13$b$ form, for example, a telecentric optical system.

The light emitted from the light source 11 enters one end of the optical fiber 11$f$. The light that enters is guided through the optical fiber 11$f$. The light is emitted from the other end of the optical fiber 11$f$. The light that is emitted is scanned by the scanning unit 12. The light that is scanned is reflected by the mirror 13$c$. The light that is reflected is emitted by passing through the first lens 13$a$ and the second lens 13$b$. The light that is emitted corresponds to the image light 18.

The image light 18 (the light that is operated upon) is reflected by the semi-transmissive reflection plate 30 and collected at a designated point (a focal point or viewpoint). The image light 18 is incident on the one eye 80$a$ of the human viewer 85. The display unit 15 provides, for example, a substantial Maxwellian view. The substantial Maxwellian view is easy to view because a display can be provided in which focus adjustment of the lens of the eye is unnecessary.

As shown in FIG. 3, for example, the transmittance of the first region 41 of the first transmittance control unit 40 is set to be low; and the transmittance of the second region 42 is set to be high. For example, a portion of the background light 19 reaches the one eye 80$a$ via the second region 42. One other portion of the background light 19 is attenuated (e.g., blocked) by the first region 41.

An example of the operation of the display device 110 will now be described.

As shown in FIG. 1, the imaging unit 50 images a first image 71 that is viewable by the human viewer 85 and generates the imaging data Di relating to the first image 71. The first image 71 is, for example, an image in front of the human viewer 85. The first image 71 includes an image of the landscape, images of various objects, etc. The imaging data Di is supplied to the operation control unit 90 via, for example, the information acquisition unit 20.

The operation control unit 90 generates the first information S1 relating to the second image 72 by deriving the second image 72 based on the imaging data Di. The second image 72 is an image inside the first image 71 inferred to be viewed by the human viewer 85.

For example, it is inferred that the human viewer 85 is viewing the central portion of the frontward image (the first image 71). In such a case, the image existing at the central portion of the first image 71 is used as the second image 72.

For example, in the case where the frontward image (the first image 71) includes character information, it is inferred that the human viewer 85 is viewing the character information. In such a case, the image inside the first image 71 including the character information is used as the second image 72.

For example, in the case where the human viewer imaging unit 17 illustrated in FIG. 2 is provided, the second image 72 can be determined based on the line of sight of the one eye 80$a$ of the human viewer 85 sensed by the human viewer imaging unit 17. In other words, the portion of the first image 71 corresponding to the line of sight that is sensed is used as the second image 72.

The second image 72 of the first image 71 that is inferred to be viewed by the human viewer 85 may be determined by a method other than those recited above.

For example, in the case where the second image 72 that is determined includes the character information, the operation control unit 90 generates image data including the character information. For example, the image data is an image in which the characters are enlarged. The image data corresponds to the first information S1. Then, the first information S1 is supplied to the information acquisition unit 20.

The information acquisition unit 20 acquires the first information S1 relating to the second image 72 of the first image 71 that is inferred to be viewed by the human viewer 85 that is derived based on the imaging data Di. The first information S1 that is acquired is supplied to the image light emission unit 10 of the display unit 15.

The image light emission unit 10 emits the image light 18 including a display object 72$d$ based on the first information S1. In the case where the second image 72 includes character information, the display object 72$d$ is, for example, an image in which the characters are enlarged.

The image light 18 emitted from the image light emission unit 10 is reflected by the semi-transmissive reflection plate 30. The image light 18 that is reflected is incident on the one eye 80$a$ of the human viewer 85. Then, the background light 19 (the light of at least a portion of the first image 71) is incident on the one eye 80$a$ by passing through the semi-transmissive reflection plate 30.

At this time, the first region 41 of the first transmittance control unit 40 is set to overlap the second image 72 as viewed by the one eye 80$a$. The second region 42 of the first transmittance control unit 40 is set not to overlap the second image 72 as viewed by the one eye 80$a$.

For example, positional information (third information 53) relating to the position of the second image 72 acquired from the operation control unit 90 is supplied to the first transmittance control unit 40 via, for example, the information acquisition unit 20. By the positional information, the position of the first region 41 inside the first transmittance control unit 40 and the position of the second region 42 inside the first transmittance control unit 40 are determined.

The first transmittance control unit 40 implements a first operation. In the first operation, the first transmittance control unit 40 causes the background light 19 to be incident on the semi-transmissive reflection plate 30 by causing the background light 19 to pass through the second region 42. Also in the first operation, the first transmittance control unit 40 causes the transmittance of the first region 41 to be lower than the transmittance of the second region 42.

In the first operation, the light of the second image 72 overlapping the first region 41 is attenuated in the first region 41 because the transmittance of the first region 41 is lower than the transmittance of the second region 42. Therefore, the intensity of the light of the second image 72 that reaches the one eye 80$a$ of the human viewer 85 is low. For example, the light of the second image 72 substantially does not reach the one eye 80$a$. Therefore, the human viewer 85 can clearly view the image (the display image formed of the image light 18) of the display object 72$d$ reflected by the semi-transmissive reflection plate 30. In other words, the viewing is easy.

On the other hand, the background light 19 reaches the one eye 80a of the human viewer 85 by passing through the second region 42 because the transmittance of the second region 42 not overlapping the second image 72 is high. Thereby, the human viewer 85 can easily view the background light 19 not overlapping the second image 72 (that is, not overlapping the display object 72d).

In the display device 110 according to the embodiment, the display object 72d is easy to view because the background light 19 overlapping the display object 72d (the display based on the second image 72 inferred to be viewed by the human viewer 85) is attenuated (e.g., blocked). The image of the background light 19 not overlapping the display object 72d also is easy to view because the background light 19 reaches the one eye 80a while maintaining the brightness of the background light 19. According to the embodiment, a wearable display device that is easy to view can be provided.

There is a configuration of a HMD in which the intensity of the external light incident on the eye is modulated according to the state of the external light. In such a method, there is a possibility that the ease of viewing may decrease due to the change of the external light. However, such a method does not control the light of the background that is incident on the eye based on the viewing state of the human viewer 85. Therefore, the ease of viewing by the human viewer 85 cannot be improved sufficiently.

The embodiment focuses on the viewing state of the human viewer 85. Then, the transmittance of the first region 41 overlapping the second image 72 inferred to be viewed is changed based on the sensing result of the viewing state of the human viewer 85. Therefore, an easily viewable display unlike conventional art can be provided. Further, in the embodiment, the display object 72d is image information relating to the second image 72 inferred to be viewed. Thereby, the image (the second image 72) that the human viewer 85 desires to view can be processed to be easy to view in the desired state and can be displayed as the display object 72d. Thereby, a more easily viewable display can be provided.

In the embodiment, the first operation recited above can be implemented when it is determined that the human viewer 85 is paying attention to the second image 72d.

For example, the operation control unit 90 determines whether or not the human viewer 85 is paying attention to the second image 72. For example, there are cases where the human viewer 85 tries to view a designated object of the frontward image (the first image 71) in detail. For example, character information, etc., is displayed on the designated object. The human viewer 85 tries to read the character information. At this time, for example, the movement of the head of the human viewer 85 decreases. In such a case, it is determined that the human viewer 85 is trying to pay attention to the second image 72. The method for determining whether or not the human viewer 85 is paying attention to the second image 72 is arbitrary. Examples of methods for determining whether or not the human viewer 85 is paying attention to the second image 72 are described below.

For example, the result of the determination implemented by the operation control unit 90 is supplied to the information acquisition unit 20. In other words, the information acquisition unit 20 further acquires second information S2 that includes the result of determining whether or not the human viewer 85 is paying attention to the second image 72. When the human viewer 85 is in the state of paying attention, the second information S2 includes the result of the human viewer 85 being determined to be paying attention. When the human viewer 85 is in the state of not paying attention, the second information S2 includes the result of the human viewer 85 being determined not to be paying attention.

The first transmittance control unit 40 implements the first operation recited above or the second operation recited below based on the second information S2 acquired by the information acquisition unit 20. In other words, the first transmittance control unit 40 implements the first operation when the second information S2 includes the result of the human viewer 85 being determined to be paying attention. The second operation recited below is implemented when the second information S2 includes the result of the human viewer 85 being determined not to be paying attention. In the second operation, the first transmittance control unit 40 causes the transmittance of the first region 41 to be higher than the transmittance of the first region 41 of the first operation. In other words, in the second operation corresponding to the state of not paying attention, for example, the transmittance of the first region 41 is increased. For example, in the state of not paying attention, the transmittance of the first region 41 is set to be the same as the transmittance of the second region 42.

In other words, in the state of paying attention in which the human viewer 85 is paying attention to something (the second image 72), the transmittance of the first region 41 overlapping the thing is partially reduced by implementing the first operation. After the thing is caused to be in a state of being difficult to view by the human viewer 85, the display object 72d based on the thing is presented to the human viewer 85. Thereby, the human viewer 85 can clearly view the display object 72d. The human viewer 85 also can easily view the background light 19 of the region not superimposed onto the thing.

On the other hand, in the state of not paying attention in which the human viewer 85 is not paying attention, for example, the transmittance of the entire first transmittance control unit 40 is high; and the human viewer 85 can easily view the entire viewable first image 71.

For example, the human viewer 85 tries to read small characters such as a warning displayed on merchandise, etc. According to the vision of the human viewer 85, the small characters may be difficult to read. When the human viewer 85 tries to read the small characters, the viewpoint of the human viewer 85 is relatively fixed. It is determined that the human viewer 85 is paying attention by sensing that the viewpoint is fixed. The second image 72 to which the human viewer 85 is paying attention corresponds to the small characters recited above. At this time, for example, an image in which the small characters recited above are enlarged is used as the display object 72d. The human viewer 85 views the enlarged image (the display object 72d). At this time, the enlarged image (the display object 72d) can be clearly viewed because the second image 72 (i.e., the small characters such as the warning displayed on the merchandise, etc.) which is the background portion of the enlarged image (the display object 72d) can be more attenuated in the first region 41. In other words, the viewing is easy.

For example, the determination recited above of whether or not attention is being paid is performed based on the temporal change of the position of the second image 72 when the imaging unit 50 is used as a reference. For example, it is determined that attention is being paid in the case where the position of the second image 72 inside the first image 71 substantially does not change for a predetermined time (e.g., not less than 1 second and not more than 3 seconds, etc.). At this time, the sensing of the position of the second image 72 inside the first image 71 reflects a prescribed sensing error.

For example, the determination recited above of whether or not attention is being paid may be performed based on the result of determining that the second image 72 includes the character information. For example, image processing of the first image 71 is performed; and after the processing, the portion corresponding to the character information is extracted from the image data. In the case where the character information is extracted, the human viewer 85 is inferred to be paying attention to the character information.

The methods recited above may be implemented in combination.

In the embodiment, the display object 72d is based on the first information S1 relating to the second image 72; and the display object 72d includes information relating to the second image 72. It is favorable for the display object 72d to be image information in which the second image 72 is processed to be easy to view.

For example, the display object 72d may include an outline that is more enhanced than an outline of the second image 72 of the first image 71 imaged by the imaging unit 50. The display object 72d may have a contrast ratio higher than a contrast ratio of the second image 72 of the first image 71 imaged by the imaging unit 50. The display object 72d may have a chroma higher than a chroma of the second image 72 of the first image 71 imaged by the imaging unit 50. The display object 72d may have a size (e.g., the size when viewed by the human viewer) that is larger than a size of the second image 72 of the first image 71 imaged by the imaging unit 50. The display object 72d may include at least one selected from the enhanced outline recited above, the high contrast ratio recited above, the high chroma recited above, and the large size. Thereby, the human viewer 85 can easily recognize the content of the second image 72 that the human viewer 85 is inferred to be viewing (e.g., paying attention to) by the display object 72d.

In the embodiment, it is favorable for the total surface area of the first region 41 and the second region 42 to be greater than the surface area of the image light 18 on the semi-transmissive reflection plate 30. For example, the first region 41 is set to substantially match the region of the image light 18 on the semi-transmissive reflection plate 30. The second region 42 can be provided around the first region 41 by increasing the total surface area of the first region 41 and the second region 42 to be greater than the surface area of the image light 18 on the semi-transmissive reflection plate 30.

For example, the surface area of the first region 41 may be not less than 0.8 times and not more than 1.2 times the surface area of the image light 18 on the semi-transmissive reflection plate 30. For example, the first region 41 may be caused to substantially match the region where the image light 18 is incident on the semi-transmissive reflection plate 30. Thereby, the background light 19 can be incident on the one eye 80a by the background light 19 incident on the region that displays the display object 72d being effectively attenuated while the background light 19 incident on a region other than the region that displays the display object 72d remains bright.

Mismatch of the focus adjustment of the lens of the eye (e.g., the one eye 80a) occurs due to the placement position of the first transmittance control unit 40. Due to the mismatch, blurring occurs at the boundary portion of the first region 41. In the case where the surface area of the first region 41 is the same as the surface area of the image light 18 on the semi-transmissive reflection plate 30, there are cases where a portion of the surroundings of the display object 72d is difficult to view due to the blurring. In the case where the surface area of the first region 41 is less than the surface area of the image light 18 on the semi-transmissive reflection plate 30, the difficulty of viewing the display object 72d can be suppressed even in the case where the blurring occurs. Therefore, it is more favorable for the surface area of the first region 41 to be less than the surface area of the image light 18 on the semi-transmissive reflection plate 30.

There are many cases where the second image 72 that is viewed by the human viewer 85 is at the front of the human viewer 85. Therefore, there are many cases where the position of the second image 72 is positioned in the central portion of the first transmittance control unit 40 as viewed by the one eye 80a. In other words, there are many cases where the first region 41 is positioned in the central portion of the first transmittance control unit 40. Because the first region 41 is a region overlapping the second image 72, it is favorable for the outline of the first region 41 to be along the outline of the configuration of the second image 72. A more easily viewable display is possible when the difference between the outline of the first region 41 and the outline of the configuration of the second image 72 is small.

Therefore, in the case where the first transmittance control unit 40 is formed of multiple images, it is more favorable for the pitch of the pixels to be smaller at the central portion of the first transmittance control unit 40 where the first region 41 is often formed than at the peripheral portion. Thereby, the number of the pixels provided in the first transmittance control unit 40 can be lower while obtaining high precision in the first region 41. Thereby, for example, the first transmittance control unit 40 can be lighter.

In the embodiment, the value of the transmittance of the first region 41 and the value of the transmittance of the second region 42 may be set arbitrarily according to the state of the human viewer 85, the state around the human viewer 85, etc. For example, the transmittance may be modified by an operation of the human viewer 85. For example, the transmittance may be modified by sensing the state of the surroundings (the brightness, etc.). The state of the surroundings (the brightness, etc.) may be sensed by, for example, the imaging unit 50, etc. The transmittance may be modified based on the state of the second image 72 (the brightness, etc.).

In the embodiment, the second transmittance control unit 45 may be operated if necessary. The second transmittance control unit 45 may continuously have, for example, a high transmittance. For example, the transmittance of the second transmittance control unit 45 may be set arbitrarily according to the state of the human viewer 85, the environmental conditions of the surroundings, etc. The transmittance of the second transmittance control unit 45 may be modified locally.

In the embodiment, a setting is possible in which the first operation recited above is not implemented when, for example, the human viewer 85 has a designated motion. For example, in the case where the first operation is implemented when the human viewer 85 is walking, for example, a portion (the second image 72, etc.) of the frontward image no longer is incident on the one eye 80a of the human viewer 85. There are cases where such a state is dangerous. Therefore, the safety of the human viewer 85 can be maintained by performing a setting of not implementing the first operation when walking.

For example, the first transmittance control unit 40 causes the transmittance of the first region 41 when acquiring the information including the result of the human viewer 85 being inferred to be walking to be higher than the transmittance of the first region 41 when the first operation is being implemented.

For example, in the case where the motion sensor 25 (referring to FIG. 2) is provided in the display device 110, the information including the result of the human viewer 85 being inferred to be walking is generated based on the sensing result of the motion sensor 25.

For example, the first transmittance control unit 40 causes the transmittance of the first region 41 when the temporal change of the spatial position of the imaging unit 50 sensed by the motion sensor 25 is not less than a predetermined threshold to be higher than the transmittance of the first region 41 when the first operation is being implemented. Thereby, the safety of the human viewer 85 can be maintained.

The information including the result of the human viewer 85 being inferred to be walking may be generated by, for example, the operation control unit 90. For example, an acceleration sensor, etc., may be provided in the operation control unit 90; and the state of the human viewer 85 (e.g., motion such as walking, etc.) may be sensed based on the sensing result of the acceleration sensor.

The position of the display device 110 (or the position of the operation control unit 90) may be determined by, for example, a GPS (Global Positioning System) function, etc. The state of the human viewer 85 (e.g., motion such as walking, etc.) may be sensed based on this result. The first operation is or is not implemented based on this result.

Second Embodiment

Figure 4:
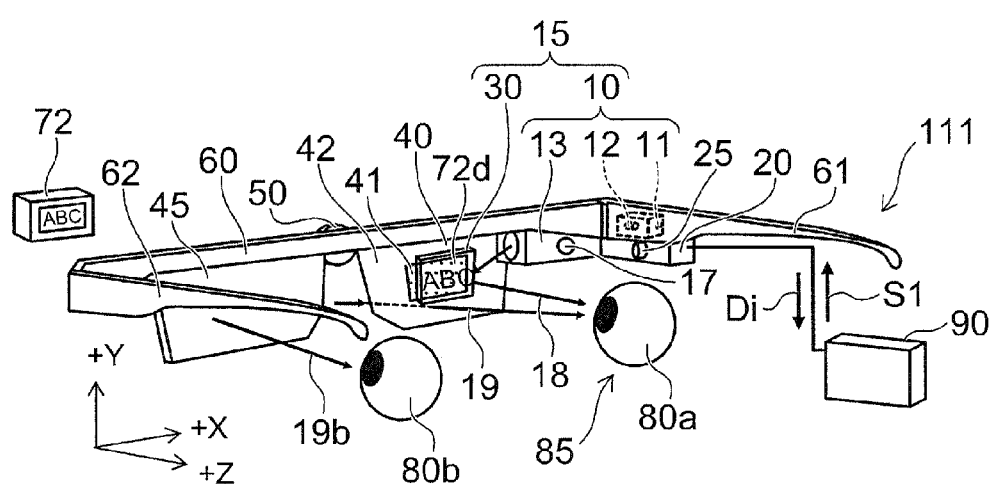
FIG. 4 is a schematic perspective view showing a display device according to a second embodiment.

FIG. 4 is a schematic perspective view illustrating the configuration of a display device according to a second embodiment.

As shown in FIG. 4, the display device 111 according to the embodiment further includes the second transmittance control unit 45 in addition to the imaging unit 50, the information acquisition unit 20, the display unit 15, and the first transmittance control unit 40. The imaging unit 50, the information acquisition unit 20, the display unit 15, and the first transmittance control unit 40 may be similar to those of the display device 110, and a description is therefore omitted. In such a case as well, the holder 60 is provided; and the holder 60 also holds the second transmittance control unit 45.

The second transmittance control unit 45 is arranged with the first transmittance control unit 40. The second transmittance control unit 45 is disposed in front of the other eye 80*b* of the human viewer 85. The second transmittance control unit 45 has variable transmittance to light 19*b* traveling toward the other eye 80*b* of the human viewer 85.

The light 19*b* is, for example, a portion of the light from the image (the first image 71) viewable by the human viewer 85.

In the embodiment, the second transmittance control unit 45 implements an operation of causing the transmittance of the second transmittance control unit 45 when the first transmittance control unit 40 is implementing the first operation recited above to be lower than the transmittance of the second transmittance control unit 45 when the first transmittance control unit 40 is not implementing the first operation. Thus, the second transmittance control unit 45 operates in conjunction with the operation of the first transmittance control unit 40.

For example, the information acquisition unit 20 acquires the first information S1 relating to the second image 72 inferred to be viewed by the human viewer 85; and the image light emission unit 10 emits the image light 18 including the display object 72*d* based on the first information S1. Then, the first transmittance control unit 40 implements the first operation of causing the transmittance of the first region 41 to be lower than the transmittance of the second region 42 while causing the background light 19 to be incident on the semi-transmissive reflection plate 30 by causing the background light 19 to pass through the second region 42. For example, the first operation is implemented when the human viewer 85 is paying attention. In other words, the information acquisition unit 20 acquires the second information S2 including the result of determining whether or not the human viewer 85 is paying attention to the second image 72; and the first operation is implemented based on the result of the second information S2 of the human viewer 85 being determined to be paying attention.

For example, the transmittance of the second transmittance control unit 45 is set to be low in the state of paying attention in which the first transmittance control unit 40 implements the first operation. In other words, in the state of paying attention, the intensity of the light 19*b* that is incident on the other eye 80*b* of the human viewer 85 is set to be low (e.g., blocked). Thereby, the human viewer 85 can more easily view the display object 72*d* by the image light 18 that is incident on the one eye 80*a*.

The transmittance of the second transmittance control unit 45 is set to be high when the first transmittance control unit 40 is not implementing the first operation. Thereby, for example, in the state of not paying attention, the human viewer 85 can easily view the image of the surroundings with the other eye 80*b*.

According to the embodiment, a wearable display device that is easier to view can be provided.

Because the image is displayed only on one eye in other monocular see-through HMDs, the background is undesirably viewed with the eye (the other eye 80*b*) on the side opposite to the one eye 80*a* which views the display of the HMD even when the background of the display of the HMD is optically shielded. Therefore, the display is difficult to view and difficult to recognize when displayed superimposed onto the actual object.

For example, if another image is viewed with the other eye 80*b* when the display object 72*d* displayed by the display unit 15 is viewed with the one eye 80*a*, the images appear to be double. Therefore, rivalry occurs between the display object 72*d* and the image of real space viewed with the other eye 80*b*; and the display is difficult to view.

In the embodiment, the rivalry is suppressed by controlling the transmittance of the second transmittance control unit 45 according to the state in which the human viewer 85 is paying attention; and an easily viewable display can be provided.

In the embodiment, for example, the transmittance of the entire second transmittance control unit 45 is modified collectively. The second transmittance control unit 45 may include, for example, an element having variable transmittance to the light such as a liquid crystal element, an electrochromic element, etc. An electrode is provided in the second transmittance control unit 45 to modify the transmittance. In the embodiment, the number of the electrodes (i.e., the images) may be one. In the embodiment, multiple pixel electrodes (i.e., multiple pixels) may be provided in the second transmittance control unit 45.

In the embodiment, a setting is possible in which the operation of the second transmittance control unit is not implemented when, for example, the human viewer 85 is in a designated state (e.g., a walking state, etc.). Thereby, the safety of the human viewer 85 can be maintained.

For example, the second transmittance control unit 45 causes the light of the first image 71 traveling toward the other eye 80b to be incident on the other eye 80b when acquiring the information including the result of the human viewer 85 being inferred to be walking.

In such a case as well, the information including the result of the human viewer 85 being inferred to be walking is generated based on, for example, at least one selected from sensing by the motion sensor 25, sensing by an acceleration sensor, etc., provided in the operation control unit 90, and sensing by an application of a GPS function, etc.

For example, the second transmittance control unit 45 causes the light of the first image 71 traveling toward the other eye 80b to be incident on the other eye 80b when the temporal change of the spatial position of the imaging unit 50 sensed by the motion sensor 25 is not less than a predetermined threshold.

For example, when it is inferred that the human viewer 85 is walking, the transmittance of the second transmittance control unit 45 when the first transmittance control unit 40 is implementing the first operation is maintained to be as high as the transmittance of the second transmittance control unit 45 when the first transmittance control unit 40 is not implementing the first operation. Thereby, the human viewer 85 can be maintained in a safer state.

Such an operation of the second transmittance control unit 45 can be implemented in conjunction with or independently from the implementation or non-implementation of the first operation of the first transmittance control unit based on the state (e.g., walking, etc.) of the human viewer 85.

Third Embodiment

Figure 5:
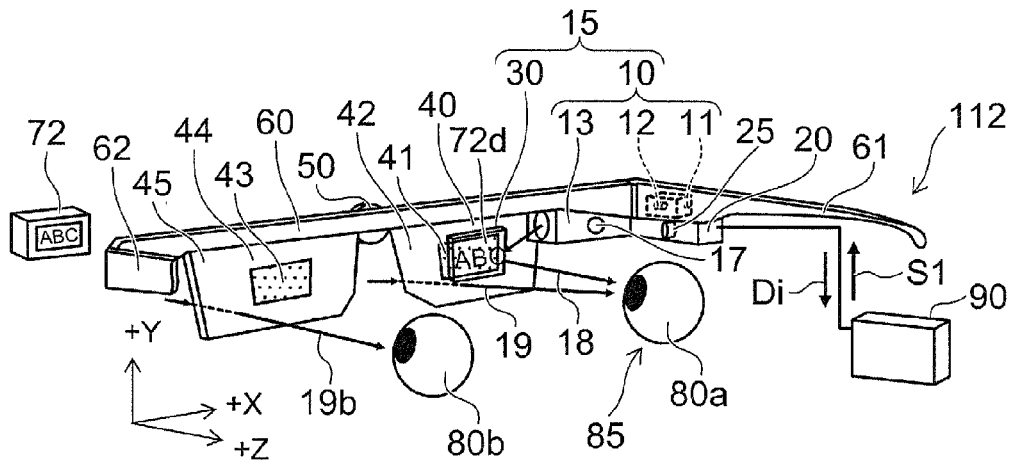
FIG. 5 is a schematic perspective view showing a display device according to a third embodiment.

FIG. 5 is a schematic perspective view illustrating the configuration of a display device according to a third embodiment.

As shown in FIG. 5, the display device 112 according to the embodiment also includes the imaging unit 50, the information acquisition unit 20, the display unit 15, the first transmittance control unit 40, and the second transmittance control unit 45. The imaging unit 50, the information acquisition unit 20, the display unit 15, and the first transmittance control unit 40 may be similar to those of the display device 110, and a description is therefore omitted.

In the embodiment, the second transmittance control unit 45 has multiple regions (e.g., a third region 43, a fourth region 44, etc.). The transmittances of the multiple regions are independently modifiable.

For example, multiple pixel electrodes are provided in the second transmittance control unit 45. The configuration described in regard to the first transmittance control unit 40 is applicable to the configuration of the second transmittance control unit 45.

For example, as viewed by the other eye 80b, the second transmittance control unit 45 has the third region 43 overlapping the second image 72, and the fourth region 44 not overlapping the second image 72.

In the embodiment, the second transmittance control unit 45 implements an operation of causing the transmittance of the third region 43 when the first transmittance control unit 40 is implementing the first operation recited above to be lower than the transmittance of the fourth region 44 when the first transmittance control unit 40 is implementing the first operation.

In other words, the transmittance of the third region 43 is set to be lower than the transmittance of the fourth region 44 when the first transmittance control unit 40 is implementing the first operation (e.g., when the human viewer 85 is in the state of paying attention). Thereby, the light of the second image 72 is not incident on the other eye 80b of the human viewer 85. Also, the light of the second image 72 incident on the other eye 80b of the human viewer 85 is attenuated. Then, the light 19b other than the second image 72 is incident on the other eye 80b of the human viewer 85 by passing through the fourth region 44.

Thereby, the human viewer 85 can clearly view the display object 72d with the one eye 80a and simultaneously can easily view the image of the background light 19 other than the second image 72 with the one eye 80a. Further, the human viewer 85 can easily view the image of the light 19b other than the second image 72 with the other eye 80b.

According to the embodiment, a wearable display device that is easier to view can be provided.

Figure 6A:
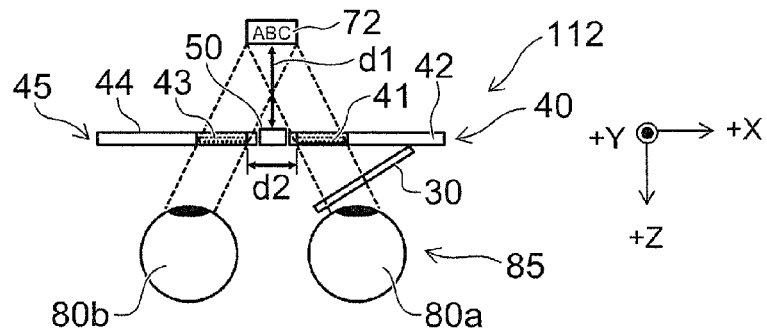
FIG. 6A and FIG. 6B are schematic plan views showing an operation of the display device according to the third embodiment.
Figure 6B:
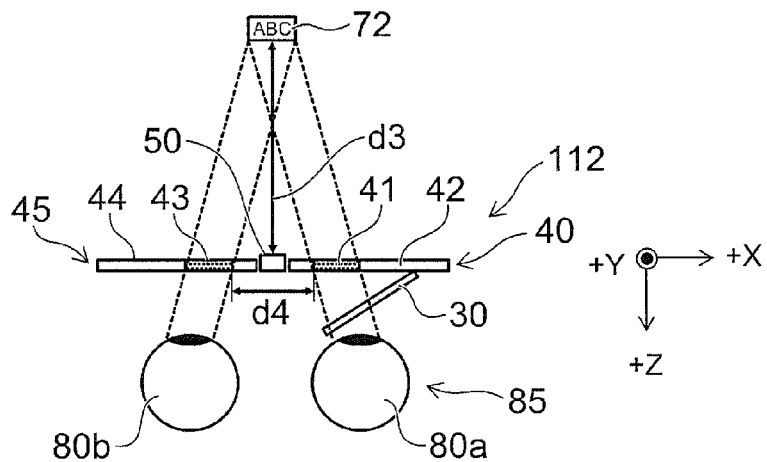

FIG. 6A and FIG. 6B are schematic plan views illustrating an operation of the display device according to the third embodiment.

FIG. 6A corresponds to the case where the distance between the display device 112 (the human viewer 85) and the second image 72 is short; and FIG. 6B corresponds to the case where the distance between the display device 112 (the human viewer 85) and the second image 72 is long.

As shown in FIG. 6A and FIG. 6B, the distance between the first region 41 and the third region 43 is changed between the cases where the distance between the display device 112 (the human viewer 85) and the second image 72 is short and long. In other words, the position of the second image 72 when viewed from the one eye 80a and the other eye 80b moves according to the distance between the display device 112 (the human viewer 85) and the second image 72. In the embodiment, the positions of the first region 41 and the third region 43 are controlled to correspond to the movement.

For example, a second distance d2 (referring to FIG. 6A) between the first region 41 and the third region 43 when the distance between the second image 72 and the imaging unit 50 is a first distance d1 is shorter than a fourth distance d4 between the first region 41 and the third region 43 when the distance between the second image 72 and the imaging unit 50 is a third distance d3 that is longer than the first distance d1.

Thereby, the light of the second image 72 being incident on the one eye 80a and the other eye 80b can be appropriately suppressed; and an easily viewable display can be provided.

The distance between the display device 112 (the human viewer 85) and the second image 72 can be sensed by, for example, the imaging unit 50. The method for sensing the distance may include, for example, a plenoptic lens method that uses a microlens array, etc.

In the embodiment as well, a setting is possible in which, for example, the operation of the second transmittance control unit is not implemented when the human viewer 85 is in a designated state (e.g., a walking state, etc.).

In such a case as well, for example, the second transmittance control unit 45 causes the light of the first image 71 traveling toward the other eye 80b to be incident on the other eye 80b when acquiring the information including the result of the human viewer 85 being inferred to be walking.

The information including the result of the human viewer 85 being inferred to be walking may be generated by any method as recited above.

For example, the second transmittance control unit 45 causes the light of the first image 71 traveling toward the other eye 80b to be incident on the other eye 80b when the temporal change of the spatial position of the imaging unit 50 sensed by the motion sensor 25 is not less than a predetermined threshold.

For example, when it is inferred that the human viewer 85 is walking, the transmittance of the third region 43 is maintained to be equally as high as the transmittance of the fourth region 44 when the first transmittance control unit 40 is implementing the first operation.

Such an operation of the second transmittance control unit 45 can be implemented in conjunction with or independently from the implementation or non-implementation of the first operation of the first transmittance control unit based on the state of the human viewer 85 (e.g., walking, etc.).

The display devices of the first to third embodiments may further include the operation control unit 90 recited above. For example, the operation control unit 90 acquires the imaging data Di relating to the first image 71 imaged by the imaging unit 50. Based on the imaging data Di, the operation control unit 90 extracts information relating to the second image 72 of the first image 71 that is inferred to be viewed by the human viewer 85. The operation control unit 90 generates the first information S1 relating to the second image 72 based on the information relating to the second image 72 that is extracted. The operation control unit 90 supplies the first information S1 that is generated to the information acquisition unit 20. The operation control unit 90 causes the first transmittance control unit 40 to implement the first operation recited above.

The operation control unit 90 may cause the second transmittance control unit 45 to implement the operation described in the second embodiment. The operation control unit 90 may cause the second transmittance control unit 45 to implement the operation described in the third embodiment.

The operation control unit 90 can determine, for example, whether or not the human viewer 85 is paying attention to the second image 72 based on the imaging data Di and can supply the second information S2 including the result that is determined to the information acquisition unit 20. Thereby, the first transmittance control unit 40 implements the first operation recited above or the second operation recited above based on the second information S2 acquired by the information acquisition unit 20. In other words, the first transmittance control unit 40 reduces the transmittance of the first region 41 (the first operation) when the human viewer 85 is paying attention and increases the transmittance of the first region 41 (the second operation) when the human viewer 85 is not paying attention.

Fourth Embodiment

Figure 7:
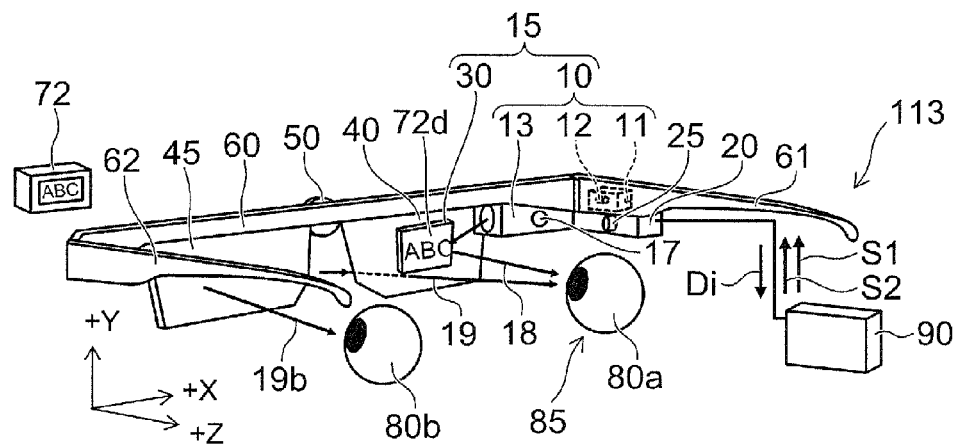
FIG. 7 is a schematic perspective view showing a display device according to a fourth embodiment.

FIG. 7 is a schematic perspective view illustrating the configuration of a display device according to a fourth embodiment.

As shown in FIG. 7, the display device 113 according to the embodiment includes the imaging unit 50, the information acquisition unit 20, the display unit 15, and the transmittance control unit (the second transmittance control unit 45).

The imaging unit 50 images the first image 71 that is viewable by the human viewer 85 and generates the imaging data Di relating to the first image 71.

The information acquisition unit 20 acquires the first information S1 and the second information S2. Such information is generated by, for example, the operation control unit 90. The first information S1 relates to the second image 72. The second image 72 is derived based on the imaging data Di and is an image inside the first image that is inferred to be viewed by the human viewer. The second information S2 includes the result of determining whether or not the human viewer 85 is paying attention to the second image 72.

The display unit 15 includes the image light emission unit 10 and the semi-transmissive reflection plate 30. The image light emission unit 10 emits the image light 18 including the display object 72d based on the first information S1. The semi-transmissive reflection plate 30 causes the image light 18 to be incident on the one eye 80a of the human viewer 85 by reflecting the image light 18 and causes the background light 19 of at least a portion of the first image 71 to be incident on the one eye 80a by transmitting the background light 19.

The second transmittance control unit 45 is arranged with the display unit 15. The transmittance control unit 45 has variable transmittance to the light 19b traveling toward the other eye 80b of the human viewer 85.

Based on the second information S2, the second transmittance control unit 45 implements an operation of causing the transmittance of at least a portion of the second transmittance control unit 45 when the human viewer 85 is in the state of paying attention (when the result of determining whether or not the human viewer 85 is paying attention to the second image 72 is the result of the human viewer 85 being determined to be paying attention) to be lower than the transmittance of the at least a portion of the second transmittance control unit 45 in the state of not paying attention (when the result of the determination is the result of the human viewer 85 being determined not to be paying attention).

In other words, the second transmittance control unit 45 of the embodiment implements the operation described in regard to the second embodiment. In the embodiment, the first transmittance control unit 40 may or may not implement the first operation.

In the embodiment, for example, the second transmittance control unit 45 modifies the transmittance of the entire second transmittance control unit 45 or a portion of the second transmittance control unit 45 based on the state in which the human viewer 85 is paying attention.

In the embodiment as well, a wearable display device that is easy to view can be provided.

Fifth Embodiment

Figure 8:
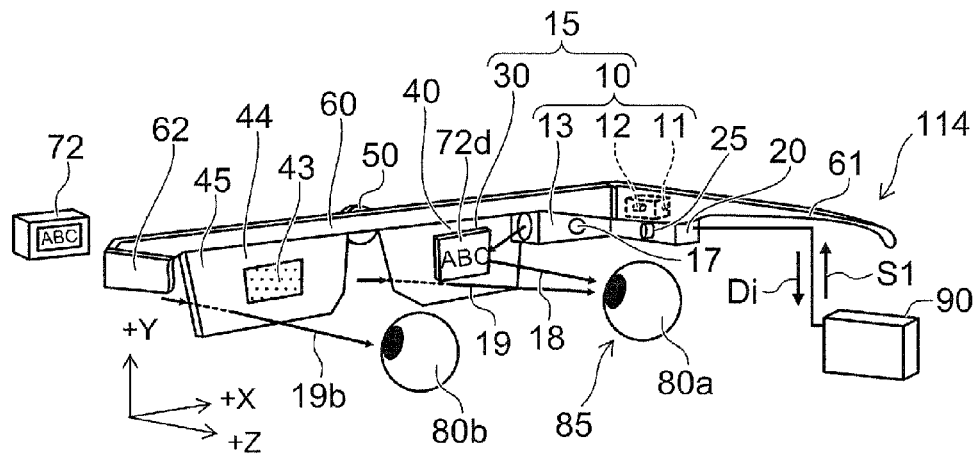
FIG. 8 is a schematic perspective view showing a display device according to a fifth embodiment.

FIG. 8 is a schematic perspective view illustrating the configuration of a display device according to a fifth embodiment.

As shown in FIG. 8, the display device 114 according to the embodiment includes the imaging unit 50, the information acquisition unit 20, the display unit 15, and the transmittance control unit (the second transmittance control unit 45). The imaging unit 50, the information acquisition unit 20, and the display unit 15 may be similar to, for example, those of the fourth embodiment, and a description is therefore omitted.

In the embodiment, the second transmittance control unit 45 modifies the transmittance of a portion of the second transmittance control unit 45 based on the state in which the human viewer 85 is paying attention.

In other words, as viewed by the other eye 80b, the second transmittance control unit 45 has the third region 43 overlapping the second image 72, and the fourth region 44 not overlapping the second image.

Based on the second information S2, the second transmittance control unit 45 causes the transmittance of the third region 43 to be lower than the transmittance of the fourth region 44 when the human viewer 85 is in the state of paying attention (when the result of determining whether or not the human viewer 85 is paying attention to the second image 72 is the result of the human viewer 85 being determined to be paying attention).

In the embodiment as well, a wearable display device that is easy to view can be provided. In the embodiment, the first transmittance control unit 40 may or may not implement the first operation.

Sixth Embodiment

Figure 9:
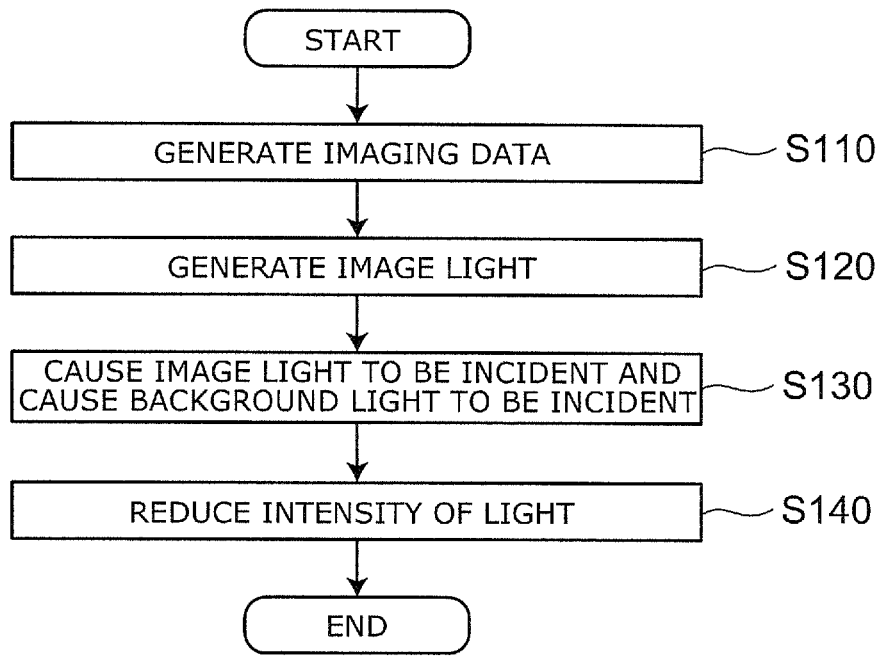
FIG. 9 is a flowchart showing a display method according to a sixth embodiment.

FIG. 9 is a flowchart illustrating a display method according to a sixth embodiment.

In the display method, the semi-transmissive reflection plate 30 is provided in front of the one eye 80a of the human viewer 85.

In the display method according to the embodiment as shown in FIG. 9, the first image 71 that is viewable by the human viewer 85 is imaged; and the imaging data Di relating to the first image 71 is generated (step S110). This operation can be performed by, for example, the imaging unit 50, the operation control unit 90, etc.

Then, the image light 18 including the display object 72d is generated based on the second image 72 of the first image 71 that is inferred to be viewed by the human viewer 85 based on the imaging data Di (step S120). This operation can be performed by, for example, the operation control unit 90 and the image light emission unit 10.

The background light 19 of at least a portion of the first image 71 is caused to be incident on the one eye 80a by causing the background light 19 to pass through a region of the semi-transmissive reflection plate 30 not overlapping the second image 72 as viewed by the one eye 80a while the image light 18 is caused to be incident on the one eye 80a by being reflected by a region of the semi-transmissive reflection plate 30 overlapping the second image 72 as viewed by the one eye 80a of the human viewer 85 (step S130).

Then, in the display method, the intensity of the background light 19 incident on the one eye 80a via the region of the semi-transmissive reflection plate 30 overlapping the second image 72 as viewed by the one eye 80a of the human viewer 85 is caused to be lower than the intensity of the background light 19 incident on the one eye 80a via the region of the semi-transmissive reflection plate 30 not overlapping the second image 72 as viewed by the one eye 80a (step S140). This operation can be performed by, for example, the first transmittance control unit 40.

For example, the operation of the display device described in regard to the first embodiment is implemented.

According to the embodiment, an easily viewable display method can be provided.

Figure 10:
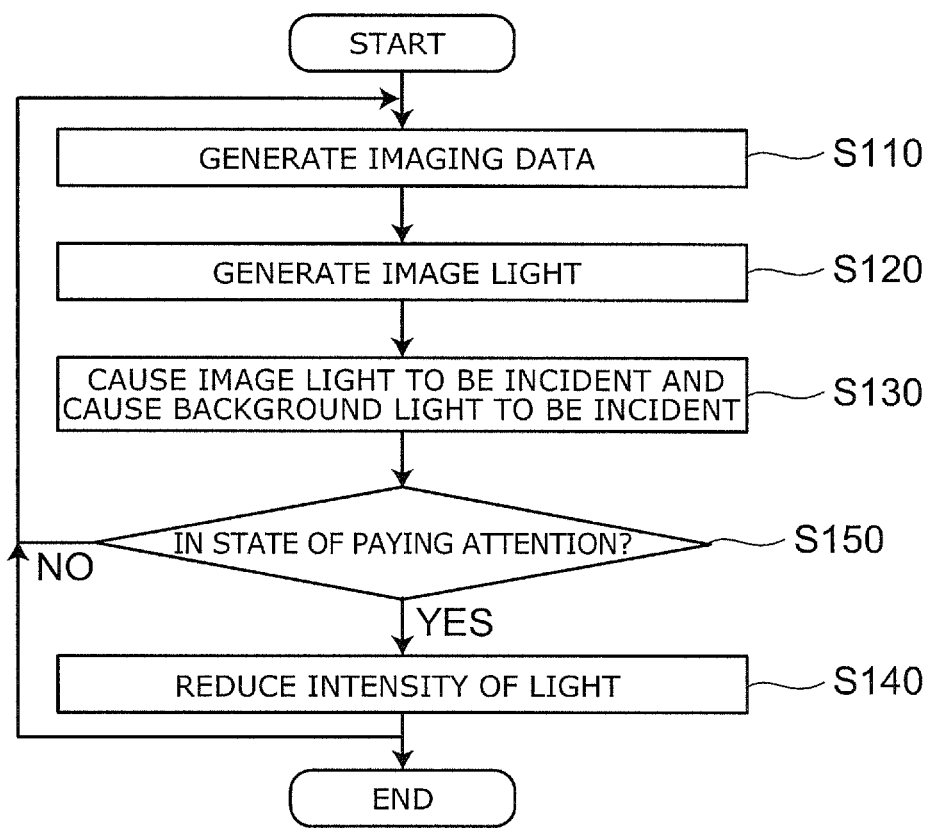
FIG. 10 is a flowchart showing another display method according to the sixth embodiment.

FIG. 10 is a flowchart illustrating another display method according to the sixth embodiment.

In the display method as shown in FIG. 10, a determination of whether or not the human viewer 85 is viewing the second image 72 is performed (step S150). This operation may be performed by, for example, the operation control unit 90.

In the case where the human viewer 85 is in the state of paying attention, step S140 recited above is implemented. In the case where the human viewer 85 is in the state of not paying attention, the flow returns to, for example, step S110 without implementing step S140.

According to the embodiment, a more easily viewable display method can be provided.

Seventh Embodiment

Figure 11:
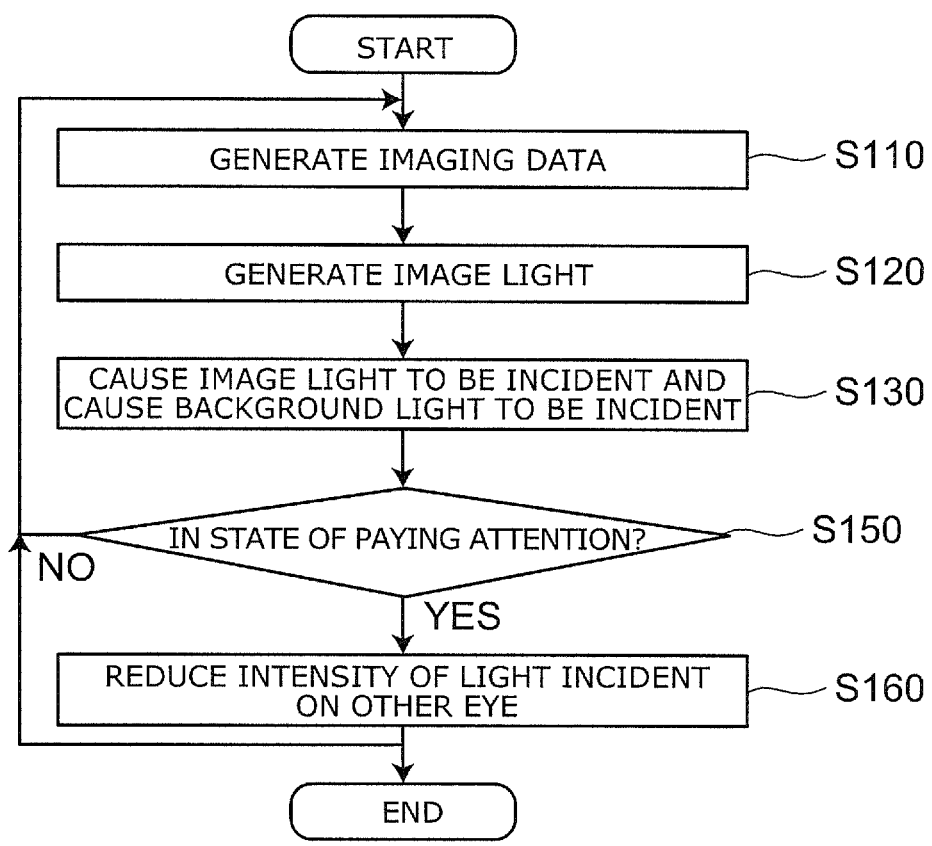
FIG. 11 is a flowchart showing a display method according to a seventh embodiment.

FIG. 11 is a flowchart illustrating a display method according to a seventh embodiment.

In the display method as well, the semi-transmissive reflection plate 30 is provided in front of the one eye 80a of the human viewer 85.

Also in the display method as shown in FIG. 11, the first image 71 that is viewable by the human viewer 85 is imaged; and the imaging data Di relating to the first image 71 is generated (step S110). Then, the image light 18 including the display object 72d is generated based on the second image 72 of the first image 71 that is inferred to be viewed by the human viewer 85 based on the imaging data Di (step S120). Continuing, the background light 19 of at least a portion of the first image 71 is caused to be incident on the one eye 80a by causing the background light 19 to pass through the semi-transmissive reflection plate 30 while the image light 18 is caused to be incident on the one eye 80a by being reflected by the semi-transmissive reflection plate 30 (step S130).

Then, it is determined whether or not the human viewer 85 is paying attention to the second image 72 (step S150).

Continuing, the intensity of the light of at least a portion of the first image 71 incident on the other eye 80b of the human viewer 85 when the human viewer 85 is determined to be paying attention to the second image 72 is caused to be lower than the intensity of the light of the at least a portion of the first image 71 incident on the other eye 80b of the human viewer 85 when the human viewer 85 is determined not to be paying attention to the second image 72 (step S160). For example, the operation described in regard to the operation of the second transmittance control unit 45 of the second embodiment or the third embodiment is implemented.

According to the embodiment, a more easily viewable display method can be provided.

Eighth Embodiment

The embodiment relates to a readable medium that causes a computer to implement the control of the display device.

The readable medium causes the computer to implement the operations recited below. Operations that are performed by a control of the computer also are included in the implementation by the computer. The computer may include, for example, the operation control unit 90, etc.

The readable medium causes the computer to generate the imaging data Di relating to the first image 71 that is viewable by the human viewer 85. The computer causes, for example, the imaging unit 50 to implement, for example, the operation of step S110 illustrated in FIG. 9.

The readable medium causes the computer the first information S1 relating to the second image 72 of the first image 71 that is inferred to be viewed by the human viewer 85 to be derived based on the imaging data Di.

The readable medium causes the computer to emit the image light 18 including the display object 72d based on the first information S1, cause the image light 18 to be incident on the one eye 80a by causing the image light 18 to be reflected by the semi-transmissive reflection plate 30 provided in front of the one eye 80a of the human viewer 85, and cause the background light 19 of at least a portion of the first image 71 to be incident on the one eye 80a by causing the background light 19 to pass through the semi-transmissive reflection plate 30. For example, the computer causes the image light emission unit 10 to implement the operation of step S120 illustrated in FIG. 9. Thereby, step S130 illustrated in FIG. 9 is implemented.

The readable medium causes the computer to cause the first transmittance control unit 40 to implement an operation. The semi-transmissive reflection plate 30 is disposed between the first transmittance control unit 40 and the one eye 80a. As viewed by the one eye 80a, the first transmittance control unit 40 has the first region 41 overlapping the second image 72, and the second region 42 not overlapping the second image 72.

The readable medium causes the computer to implement the first operation of the first transmittance control unit 40 to cause the transmittance of the first region 41 to be lower than the transmittance of the second region 42 while causing the background light 19 to be incident on the semi-transmissive reflection plate 30 by causing the background light to pass through the second region 42 of the first transmittance control unit 40. For example, the computer causes the first transmittance control unit 40 to implement the operation of step S140 illustrated in FIG. 9.

According to the embodiment, a readable medium capable of a more easily viewable display can be provided.

In the embodiment, as described above, the implementation or non-implementation of the first operation may be changed according to the state in which the human viewer is paying attention.

For example, the readable medium causes the computer to determine whether or not the human viewer 85 is paying attention to the second image 72. For example, the computer is caused to implement the operation of step S150 illustrated in FIG. 10. For example, the computer is caused to generate the second information S2 including the result of determining whether or not the human viewer 85 is paying attention to the second image 72.

Also, when the human viewer 85 is determined to be paying attention, the computer is caused to implement the first operation of the first transmittance control unit 40. Then, when the human viewer 85 is determined not to be paying attention, the computer is caused to implement the second operation of the first transmittance control unit 40. The transmittance of the first region 41 in the second operation is higher than the transmittance of the first region 41 in the first operation.

Ninth Embodiment

The embodiment relates to a readable medium that causes a computer to implement the control of the display device.

The readable medium causes the computer to implement the operations recited below.

The readable medium causes the computer to image the first image 71 that is viewable by the human viewer 85 and generate the imaging data relating to the first image 71. The computer causes, for example, the imaging unit 50 to implement, for example, the operation of step S110 illustrated in FIG. 11.

The readable medium causes the derivation of the first information S1 relating to the second image 72 of the first image 71 that is inferred to be viewed by the human viewer 85 based on the imaging data Di and the determination of whether or not the human viewer 85 is paying attention to the second image 72. For example, the computer is caused to implement the operation of step S150 illustrated in FIG. 11.

The readable medium causes the computer to emit the image light 18 including the display object 72d based on the first information S1, cause the image light 18 to be incident on the one eye 80a by causing the image light 18 to be reflected by the semi-transmissive reflection plate 30 provided in front of the one eye 80a of the human viewer 85, and cause the background light 19 of at least a portion of the first image 71 to be incident on the one eye 80a by causing the background light 19 to pass through the semi-transmissive reflection plate 30. For example, the computer causes the image light emission unit 10 to implement the operation of step S120 shown in FIG. 11. Thereby, step S130 illustrated in FIG. 11 is implemented.

The readable medium causes the computer to implement the operation of the second transmittance control unit 45 of causing the transmittance of at least a portion of the second transmittance control unit 45 provided in front of the other eye 80b and having variable transmittance to the light traveling toward the other eye 80b when the human viewer 85 is determined to be paying attention to be lower than the transmittance of the at least a portion of the second transmittance control unit 45 when the human viewer 85 is determined not to be paying attention. For example, the computer is caused to implement the operation of step S160 illustrated in FIG. 11.

According to the embodiment, a readable medium capable of a more easily viewable display can be provided.

According to the embodiments, a readable medium, a display method, and a display device that is wearable and easy to view can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, embodiments of the invention are described with reference to specific examples. However, the invention is not limited to these specific examples. For example, one skilled in the art may similarly practice the invention by appropriately selecting specific configurations of components included in the display device such as the imaging unit, the information acquisition unit, the display unit, the image light emission unit, the semi-transmissive reflection plate, the first transmittance control unit, the second transmittance control unit, the operation control unit, the human viewer imaging unit, the motion sensor, the holder, the operation control unit, etc., from known art; and such practice is included in the scope of the invention to the extent that similar effects are obtained.

Further, any two or more components of the specific examples may be combined within the extent of technical feasibility and are included in the scope of the invention to the extent that the purport of the invention is included.

Moreover, all display devices, a display methods, and readable mediums practicable by an appropriate design modification by one skilled in the art based on the display devices, the display method, and the readable medium described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A display device, comprising:
    an imaging unit configured to image a first image of a background viewable by a viewer and generate imaging data relating to the first image;
    an information acquisition unit configured to acquire first information relating to a second image inside the first image, the second image being on a line of sight of the viewer;
    a display unit including
        an image light emission unit configured to emit image light based on the first information, and
        a semi-transmissive reflection plate configured to reflect the image light and configured to transmit the background light; and
    a first transmittance control plate, the semi-transmissive reflection plate being disposed between the first transmittance control plate and one eye of the viewer, the first transmittance control plate having a first region and a second region, the first region overlapping a part of the background and the semi-transmissive reflection plate as viewed by the one eye, the second region not overlapping the part of the background as viewed by the one eye, the second image being an image of the part of the background, the first transmittance control plate being configured to implement a first operation of causing a transmittance of the first region to be lower than a transmittance of the second region while causing the background light to be incident on the semi-transmissive reflection plate by causing the background light to pass through the second region; and
    a second transmittance control plate arranged with the first transmittance control plate, the second transmittance control plate having variable transmittance to light traveling toward other eye of the viewer,
    the second transmittance control plate being configured to implement an operation of causing the transmittance of the second transmittance control plate when the first transmittance control plate is implementing the first operation to be lower than the transmittance of the second transmittance control plate when the first transmittance control plate is not implementing the first operation.

2. The device according to claim 1, wherein
    the information acquisition unit is configured to further acquire second information including a result of determining whether or not the viewer is paying attention to the second image, and
    the first transmittance control plate, based on the second information acquired by the information acquisition unit, is configured to:
        implement the first operation when the second information includes a result of the viewer being determined to be paying attention; and
        implement a second operation of causing, when the second information includes a result of the viewer being determined not to be paying attention, the transmittance of the first region to be higher than the transmittance of the first region of the first operation.

3. The device according to claim 2, wherein the determining is performed based on a temporal change of a position of the second image when the imaging unit is used as a reference.

4. The device according to claim 2, wherein the determining is performed based on a result of the second image being determined to include character information.

5. The device according to claim 1, wherein the display object includes at least one selected from:
    an outline more enhanced than an outline of the second image of the first image imaged by the imaging unit;
    a contrast ratio higher than a contrast ratio of the second image of the first image imaged by the imaging unit;
    a chroma higher than a chroma of the second image of the first image imaged by the imaging unit; and
    a size larger than a size of the second image of the first image imaged by the imaging unit.

6. The device according to claim 1, wherein a total surface area of the first region and the second region is greater than a surface area of the image light on the semi-transmissive reflection plate.

7. The device according to claim 1, wherein a surface area of the first region is not less than 0.8 times and not more than 1.2 times a surface area of the image light on the semi-transmissive reflection plate.

8. The device according to claim 1, wherein a surface area of the first region is less than a surface area of the image light on the semi-transmissive reflection plate.

9. The device according to claim 1, wherein
    the second transmittance control plate has a third region overlapping the second image as viewed by the other eye, and a fourth region not overlapping the second image as viewed by the other eye,
    the second transmittance control plate is configured to implement an operation of causing a transmittance of the third region when the first transmittance control plate is implementing the first operation to be lower than a transmittance of the fourth region when the first transmittance control plate is implementing the first operation.

10. The device according to claim 9, wherein a second distance between the first region and the third region when a distance between the second image and the imaging unit is a first distance is shorter than a fourth distance between the first region and the third region when the distance between the second image and the imaging unit is a third distance, the third distance being longer than the first distance.

11. The device according to claim 1, wherein the second transmittance control plate is configured to cause light of the first image traveling toward the other eye to be incident on the other eye when acquiring information indicating the viewer being inferred to be walking.

12. The device according to claim 1, wherein the first transmittance control plate is configured to cause the transmittance of the first region when acquiring information indicating the viewer being inferred to be walking to be higher than the transmittance of the first region when the first operation is being implemented.

13. The device according to claim 1, further comprising an operation control unit configured to:
    acquire the imaging data relating to the first image imaged by the imaging unit;
    supply the first information relating to the second image to the information acquisition unit by extracting, based on the imaging data, information relating to the second image inside the first image, the second image being inferred to be viewed by the viewer; and
    cause the first transmittance control plate to implement the first operation.

14. The device according to claim 13, wherein the operation control unit is configured to determine whether or not the viewer is paying attention to the second image based on the imaging data and supply second information including the determined result to the information acquisition unit.

15. A display method, comprising:
    imaging a first image of a background viewable by a viewer and generating imaging data relating to the first image;
    producing, based on the imaging data, image light based on a second image inside the first image, the second image being on a line of sight of the viewer;
    causing a background light of at least a portion of the first image to be incident on one eye of the viewer by causing the background light to pass through a region of a semi-transmissive reflection plate not overlapping a part of the background as viewed by the one eye while causing the image light to be incident on the one eye by being reflected by a region of the semi-transmissive reflection plate overlapping the part of the background as viewed by the one eye, the semi-transmissive reflection plate being provided in front of the one eye of the viewer, the second image being an image of the part of the background;
    performing a first operation to cause an intensity of the background light incident on the one eye of the viewer via the region of the semi-transmissive reflection plate overlapping the part of the background as viewed by the one eye to be lower than an intensity of the background light incident on the one eye via the region of the semi-transmissive reflection plate not overlapping the part of the background as viewed by the one eye; and
    causing a transmittance of a second transmittance control plate when the first operation is performed to be lower than the transmittance of the second transmittance control plate when the first operation is not performed, the second transmittance control plate being arranged with the first transmittance control plate, the second transmittance control plate having variable transmittance to light traveling toward other eye of the viewer.

* * * * *